(12) United States Patent
Kim et al.

(10) Patent No.: US 7,662,310 B2
(45) Date of Patent: Feb. 16, 2010

(54) PHOSPHOR PASTE COMPOSITION COMPRISING PHOSPHATE ESTER AS DISPERSANT AND DISPLAY USING THE SAME

(75) Inventors: Seul Ki Kim, Goyang-si (KR); Eun Sung Lee, Seoul (KR); Jae Young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 667 days.

(21) Appl. No.: 11/322,234

(22) Filed: Jan. 3, 2006

(65) Prior Publication Data

US 2006/0145589 A1 Jul. 6, 2006

Related U.S. Application Data

(63) Continuation-in-part of application No. 11/159,140, filed on Jun. 23, 2005, now abandoned.

(30) Foreign Application Priority Data

Jan. 3, 2005 (KR) .............. 10-2005-0000260
Sep. 13, 2005 (KR) .............. 10-2005-0085166

(51) Int. Cl.
  *C09K 11/02* (2006.01)
  *C09K 11/77* (2006.01)
  *C08K 5/52* (2006.01)
  *C09K 11/08* (2006.01)
(52) U.S. Cl. .............. 252/301.36; 252/301.4 R; 524/145
(58) Field of Classification Search .......... 252/519.33, 252/521.1, 301.36–301.6 R; 524/145
  See application file for complete search history.

(56) References Cited

U.S. PATENT DOCUMENTS

2007/0072969 A1* 3/2007 Lee et al. .............. 524/113
2007/0157852 A1* 7/2007 Lee et al. .............. 106/278

FOREIGN PATENT DOCUMENTS

| JP | 2000-203887 | | 7/2000 |
|---|---|---|---|
| JP | 2001-262136 | | 9/2001 |
| JP | 2001-262136 | A | 9/2001 |
| KR | 1020010037347 | A | 5/1999 |
| KR | 1020030033564 | A | 5/2001 |
| KR | 2001-0096586 | A | 11/2001 |

OTHER PUBLICATIONS

Chang. Formation of Barrier Ribs for Plasma Display Panel via Capillary Molding—Effects of Sintering Conditions on Barrier Rib Morphology. Jpn J. Appl. Phys. vol. 42 (2003) pp. 7541-7546.
Lim et al., Effect of the Molecular Weight of Polyethylene Glycol on the Plasticization of Green Sheets Composed of Ultrafine $BaTiO_3$ Particles and Polyvinyl Butyral, Mat. Res. Bul. 38, pp. 1021-1023 (2003).

* cited by examiner

*Primary Examiner*—C. Melissa Koslow
*Assistant Examiner*—Matthew E Hoban
(74) *Attorney, Agent, or Firm*—Cantor Colburn LLP

(57) ABSTRACT

Disclosed herein is a phosphor paste composition, which includes a phosphor, a dispersant, and a binder solution composed of a solvent and an organic binder, in which the dispersant includes iso-octylphenol ethoxylated phosphoric acid, phosphate ester of a block copolymer of nonylphenol and polyoxyethyleneglycol, or phosphate ester containing an acryl backbone. In addition, a display device using the phosphor paste composition is provided. The phosphor paste composition of this invention can be applied to various phosphor screens for display devices and to display devices, thus increasing high physical properties, including luminance, and greatly improving workability.

9 Claims, 6 Drawing Sheets

PHOSPHOR PASTE COMPOSITION COMPRISING PHOSPHATE ESTER AS DISPERSANT AND DISPLAY USING THE SAME

CROSS-REFERENCE TO RELATED PATENT APPLICATION

This non-provisional application claims priority under 35 U.S.C. §119(a) to Korean Patent Application Nos. 2005-260 and 2005-85166 filed on Jan. 3, 2005 and Sep. 13, 2005, respectively, which are herein incorporated by reference.

BACKGROUND OF THE INVENTION

1. Field of the Invention

Embodiments of the present invention relate, generally, to a phosphor paste composition comprising phosphate ester as a dispersant, and a display device using the same. More particularly, embodiments of the present invention relate to a novel phosphor paste composition, in which phosphate ester is used as a dispersant to increase the loading amount of a phosphor without greatly increasing the viscosity thereof, thus improving luminance and maintaining excellent workability, and to a display device using the phosphor paste composition.

2. Description of the Related Art

Recently, display devices have been developed from conventional cathode ray tubes (CRTs) to plasma display panels (PDPs), liquid crystal displays (LCDs) or field emission displays (FEDs) having various applications. Such display devices have a phosphor screen in common.

The PDP, which is receiving emphasis as a flat panel display device for future use as a digital imaging display, is a display for realizing an image by exciting a phosphor screen using UV light emitted upon electrical discharge by a gas. The quality of the PDP depends on the phosphor screen. That is, even though the phosphor itself has high luminance, if the phosphor screen is not formed as desired, the PDP does not exhibit high luminance.

Typically, the phosphor screen is prepared by uniformly applying a phosphor paste composition on a substrate and then drying it. The phosphor paste composition is composed mainly of a solvent, a binder, and a phosphor, and further includes a dispersant to improve the dispersibility of the phosphor, if necessary.

Conventionally, phosphor pastes have had no dispersant, or have frequently used carboxylic acid as a dispersant. However, such a conventional phosphor paste having no dispersant or having carboxylic acid as a dispersant is disadvantageous because the decrease in viscosity is insignificant, and thus, the loading amount of the phosphor becomes small.

Also, the phosphor included in the phosphor paste is formed mainly of inorganic material. Hence, if the loading amount of the phosphor is increased, the viscosity is also increased, and the phosphor screen is difficult to make uniform, resulting in reduced workability. Consequently, productivity is lowered.

In this regard, Korean Patent Laid-open Publication No. 2001-96586 discloses a phosphor paste composition and a phosphor screen using the same, in which phosphate ester represented by Formula 1, below, is used as a dispersant.

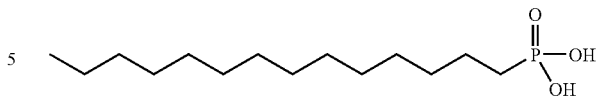

Formula 1

However, the phosphate ester used as a dispersant in the above patent is an alkylester of alkylphosphonic acid, which is typically exemplified by methylester of 1-tetradecane phosphonic acid (TDPA) having a low molecular weight of 278.37 and a relatively short tail. Although the dispersant disclosed in the above publication may more efficiently disperse the phosphor than many other conventional dispersants, the dispersibility thereof is still unsatisfactory.

Therefore, there is urgent need for the development of a phosphor paste, which enables an increase in the loading amount of the phosphor and the exhibition of excellent workability, in order to realize a phosphor screen having high luminance.

OBJECTS AND SUMMARY

Accordingly, embodiments of the present invention have been made keeping in mind the above problems occurring in the related art, and an object of embodiments of the present invention is to provide a novel phosphor paste composition, which increases the loading amount of a phosphor without having greatly increased viscosity, therefore improving luminance and manifesting excellent workability.

Another object of embodiments of the present invention is to provide a phosphor screen having high luminance and superior processability.

A further object of embodiments of the present invention is to provide a display device comprising such a phosphor screen.

According to a first embodiment of the present invention for accomplishing the above objects, a phosphor paste composition is provided, which comprises a phosphor, a binder solution including a solvent and an organic binder, and a dispersant, in which the dispersant is at least one selected from the group consisting of: compounds represented by Formulas 2 and 3 below:

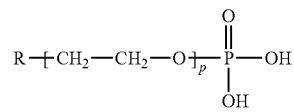

Formula 2 wherein R is a hydrophobic aliphatic hydrocarbon of a molecular weight in a range of 1 to 1000 with or without aromatic ring, p is 1 to 22

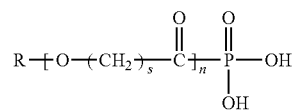

Formula 3 wherein R is a hydrophobic aliphatic hydrocarbon of a molecular weight in a range of 1 to 1000 with or without aromatic ring;

s is 1 to 20; and n is 1 to 20.

In the phosphor paste composition of embodiments of the present invention, the dispersant may be selected from the group consisting of compounds represented by Formulas 4 to 6 below:

Formula 4

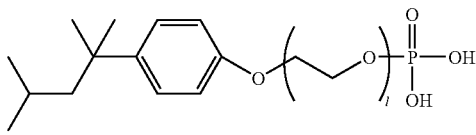

wherein l is an integer from 1 to 20;

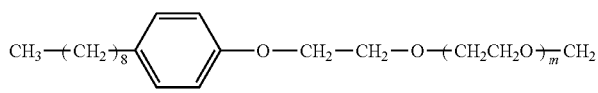

wherein m is an integer from 1 to 20; and

Formula 6

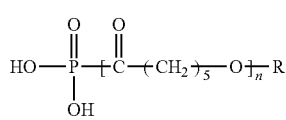

wherein R is an oxyethylenemethacryloyl group, an oxyethylacryloyl group, a polyoxypropylmethacryloyl group, or a polyoxyethylmethacryloyl group, and n is an integer from 1 to 20.

The phosphor paste composition of embodiments of the present invention may comprise 40-70 wt % of the phosphor, and 0.1-3 wt % of the dispersant relative to the phosphor, with the balance being binder solution.

According to a second embodiment of embodiments of the present invention for accomplishing the above objects, a phosphor screen for display devices, which is manufactured using the phosphor paste composition, is provided.

According to a third embodiment of embodiments of the present invention for accomplishing the above objects, a display device comprising the phosphor screen, suitable for use in a plasma display device or a field emission display device, is provided.

DESCRIPTION OF THE PREFERRED EMBODIMENTS

Figure 1:
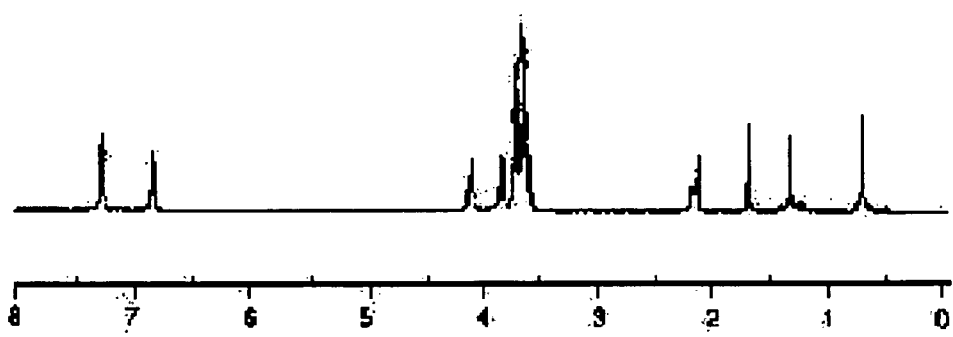
FIG. 1 is an $^1$H-NMR spectrum of a dispersant used for a phosphor paste composition of embodiments of the present invention.

Hereinafter, a detailed description will be given of embodiments of the present invention, with reference to the appended drawings.

Embodiments of the present invention provide a phosphor paste composition, which is characterized by including a dispersant being selected from the group consisting of compounds represented by Formulas 2 and 3 below:

Formula 2

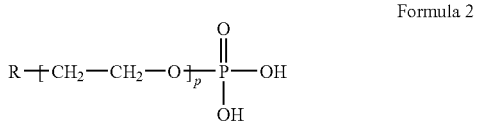

wherein R is a hydrophobic aliphatic hydrocarbon of a molecular weight in a range of 1 to 1000 with or without aromatic ring, p is 1 to 22

Formula 3

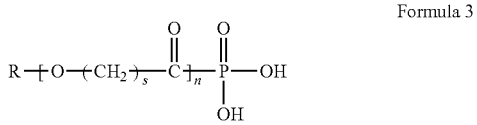

wherein R is a hydrophobic aliphatic hydrocarbon of a molecular weight in a range of 1 to 1000 with or without aromatic ring;

s is 1 to 20; and n is 1 to 20.

In this way, phosphate ester may be used as the dispersant, thus uniformly maintaining viscosity and increasing the loading amount of a phosphor. The dispersant functions to prevent the agglomeration of phosphor particles through adsorption to the surfaces of the particles, thereby increasing the packing factor of the phosphor particles in the phosphor paste. Thus, the luminance of a phosphor screen or a display device may be increased by the use of the phosphor paste composition of embodiments of the present invention.

Of dispersants, iso-octylphenol ethoxylated phosphoric acid is represented by Formula 4 below:

Formula 4

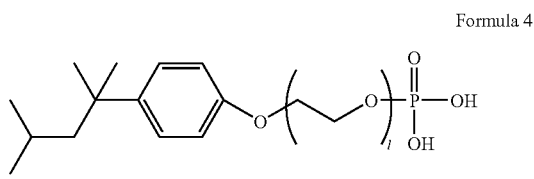

wherein l is an integer from 1 to 20.

In addition, phosphate ester of the block copolymer of nonylphenol and polyoxyethyleneglycol is represented by Formula 5 below:

Formula 5

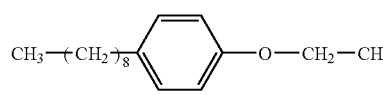

wherein m is an integer from 1 to 20.

In addition, phosphate ester having an acryl backbone is represented by Formula 6 below:

Formula 6

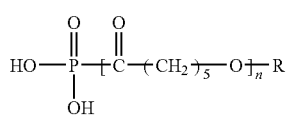

wherein R is an oxyethylenemethacryloyl group, an oxyethylacryloyl group, a polyoxypropylmethacryloyl group, or a polyoxyethylmethacryloyl group, and n is an integer from 1 to 20.

In addition, the solvent, the binder, and the phosphor of the phosphor paste composition of embodiments of the present invention may be equal or similar to those used for the preparation of conventional phosphor paste compositions. The phosphor paste composition of embodiments of the present invention may be prepared by adding the dispersant to the binder solution and then adding phosphor powder.

In embodiments of the present invention, the binder solution may include an organic binder and a solvent. The organic binder may be dissolved in the solvent to provide the solvent with viscosity, and functions to confer bondability to the dried phosphor paste composition. Examples of organic binder resins usable in embodiments of the present invention include acryls, styrenes, celluloses, methacrylic acid ester polymers, styrene-acrylic acid ester copolymers, polystyrenes, polyvinylbutyrals, or polyvinylalcohols, but are not limited thereto. For example, upon screen printing, a cellulose polymer, such as ethyl cellulose, is preferably used.

As the solvent included in the binder solution, commercially available solvents may be used alone or in mixtures thereof, in consideration of the properties of the phosphor, the organic binder and the phosphor paste composition. A solvent useful in the phosphor paste composition of embodiments of the present invention is not particularly limited, but preferably includes any solvent having a volatile temperature of 150° C. or higher.

The solvent used in embodiments of the present invention may be exemplified by aromatic hydrocarbons, such as toluene, xylene, etc.; ethers, such as tetrahydrofuran, 1,2-butoxyethane, etc.; ketones, such as acetone, methylethylketone, etc.; esters, such as ethyl acetate, butyl acetate, butyl carbitol acetate (BCA), etc.; or alcohols, such as isopropylalcohol, diethyleneglycol monobutylether, terpineol, 2-phenoxyethanol, etc. Further, the use of a solvent mixture comprising terpineol and BCA is preferable. In such a solvent mixture, terpineol and BCA may be mixed at a weight ratio of 1:1 to 1:2.5, and preferably 1:1.7.

The binder solution may include 1.5-5 wt % of the organic binder, with the balance preferably being the solvent mixture. If the organic binder is used in an amount less than 1.5 wt %, the amount of the solvent is much larger than that of the organic binder, and the resultant phosphor screen may have poor properties, such as low quality, due to the lack of organic binder. On the other hand, if the organic binder is used in an amount exceeding 5 wt %, the amount of the solvent is correspondingly decreased, thus reducing the loading amount of the phosphor.

The phosphor used in the phosphor paste composition of embodiments of the present invention includes any phosphor as long as it may be used for conventional phosphor paste compositions. In particular, the kind or component of phosphor used is not limited. However, since the phosphor paste composition of embodiments of the present invention is mainly used to form a phosphor screen for FPDs such as PDPs or FEDs, the phosphor should be appropriately selected depending on the type of excitation for exciting the phosphor screen of the display. Specifically, the phosphors include commercially available red phosphors, green phosphors and blue phosphors, which are in the form of solid solutions of oxide typically used in display devices. Preferably, the phosphor in the form of a solid solution of a mixture comprising barium oxide, magnesium oxide and aluminum oxide may be used. In addition, the phosphor paste composition of embodiments of the present invention further includes a plasticizer, a leveling agent, an antifoamer, etc., in addition to the dispersant, within a range that does not deteriorate the properties of the composition.

The phosphor paste composition of embodiments of the present invention preferably comprises 40 to 70 wt % of the phosphor, and 0.1 to 3 wt % of the dispersant relative to the amount of phosphor powder, with the balance being the binder solution. In embodiments of the present invention, if the dispersant is used in an amount less than 0.1 wt %, an increase in loading amount of the phosphor and maintenance of viscosity may not be sufficiently realized. On the other hand, if the amount of dispersant exceeds 3 wt %, the amounts of other components are decreased, thus potentially yielding poor paste properties.

In embodiments of the present invention, the amount of phosphor can be increased to about 40-70 wt %, by virtue of the use of the phosphate ester as the dispersant. The high loading amount of the phosphor in the phosphor paste results in increased luminance of the phosphor screen formed of such a paste.

In addition, embodiments of the present invention provide a phosphor screen manufactured using the phosphor paste composition as mentioned above. The phosphor screen of embodiments of the present invention may be manufactured by applying the phosphor paste composition in a predetermined pattern on a glass or transparent plastic substrate, followed by drying and baking. A process of forming a phosphor screen includes, for example, pattern screen printing, electrophoresis, photolithography, ink-jetting, etc., but is not limited thereto.

The phosphor screen of embodiments of the present invention may include a greatly increased loading amount of the phosphor per unit area thereof from the use of phosphate ester as a dispersant. Hence, the luminance of the phosphor screen is greatly improved without a large increase in viscosity, and thus, the processability when manufacturing the phosphor screen is improved.

In addition, the phosphor screen of embodiments of the present invention can be used as a phosphor screen for known display devices such as PDPs, LCDs or FEDs. The display devices including the phosphor screen of embodiments of the present invention can realize high luminance.

A better understanding of embodiments of the present invention may be obtained in light of the following examples which are set forth to illustrate, but are not to be construed to limit embodiments of the present invention.

Example

Synthesis of Phosphate Ester as Dispersant

A dispersant represented by Formula 7 below was synthesized according to the following Reaction 1:

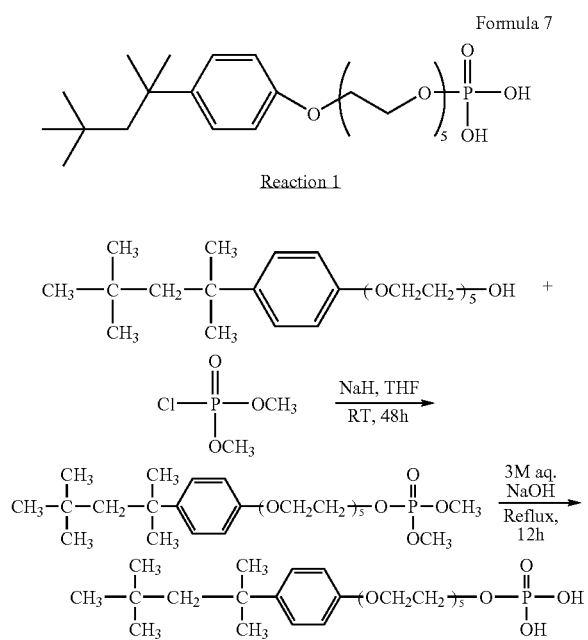

At 25° C., sodium hydride (50 mmol) was slowly added to a solution (25 mmol) of TX-45™ (Sigma-Aldrich® Co., USA) of Formula 8 below in dry HF (50 mmol), followed by stirring the reaction mixture for 2 hours. The resulting mixture was added dropwise with methyl chlorophosphate (50 mmol) at 0° C. for 2 hours and was then stirred at 25° C. for 12 hours in a nitrogen atmosphere. Subsequently, the reaction mixture was poured into ice water, after which an organic layer was separated and washed with an aqueous HCl solution and water. The product thus obtained was added to a mixture comprising a 3 M aqueous NaOH solution (100 ml) and methanol (10 ml). The solution was refluxed for 12 hours. The pH of the reaction mixture was controlled to 2 using the aqueous HCl solution. Through separation of the organic layer using methylene chloride and evaporation of the solvent, the phosphate ester of Formula 7 was obtained as yellowish viscous oil (yield 84%). The $^1$H-NMR spectrum at 500 MHz of the dispersant thus obtained is shown in FIG. 1.

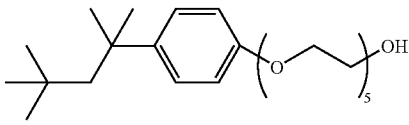

Example 1

As a phosphor, commercially available $BaMgAl_{10}O_{17}$:$Eu^{2+}$ powder (K)(501A Kasei Optonix Ltd. Japan) was used. The phosphor powder was vacuum dried at 130° C. for 24 hours in an atmosphere before use. 4.61 g of α-terpineol and 7.68 g of BCA were mixed together to prepare a solvent mixture. In addition, 0.51 g of ethylcellulose as an organic binder was dissolved in the solvent mixture, to prepare a binder solution. The binder solution was added with the phosphor powder and the phosphate ester of Formula 7 as a dispersant and then milled therewith, thus preparing a phosphor paste composition of an embodiment of the present invention.

Example 2

0.51 g of ethyl cellulose, as an organic binder, and a solvent mixture comprising 4.61 g of terpineol and 7.68 g of BCA were mixed together to prepare a binder solution. The binder solution was mixed with 0.14 g of phosphate ester of an acryl ester block copolymer of Formula 6 (in which R is an oxyethylenemethacryloyl group and n is 5) (BYK 111, available from BYK-Chemie GmbH, Germany) as a dispersant, and 14 g of $BaMgAl_{10}O_{17}$:$Eu^{2+}$ powder (KX501A Kasei Optonix Ltd. Japan) as phosphor powder, to obtain a phosphor paste composition.

Example 3

A phosphor paste composition was prepared in the same manner as in Example 1, with the exception that phosphate ester of a block copolymer of polyoxyethyleneglycol of Formula 5 (m=8) was used as a dispersant.

Comparative Example 1

A phosphor paste composition was prepared in the same manner as in Example 1, with the exception that the dispersant was not used.

Comparative Examples 2 and 3

Each phosphor paste composition was prepared in the same manner as in Example 1, with the exception that commercially available 1-tetradecane phosphonic acid of Formula 1 (TPDA, Alfar Aesar® USA) and TX-45™ (Sigma-Aldrich® Co., USA) of Formula 8 were used as the dispersant, respectively.

Experimental Example 1

Assay of Viscosity Varying with Loading Amount of Phosphor

Figure 2:
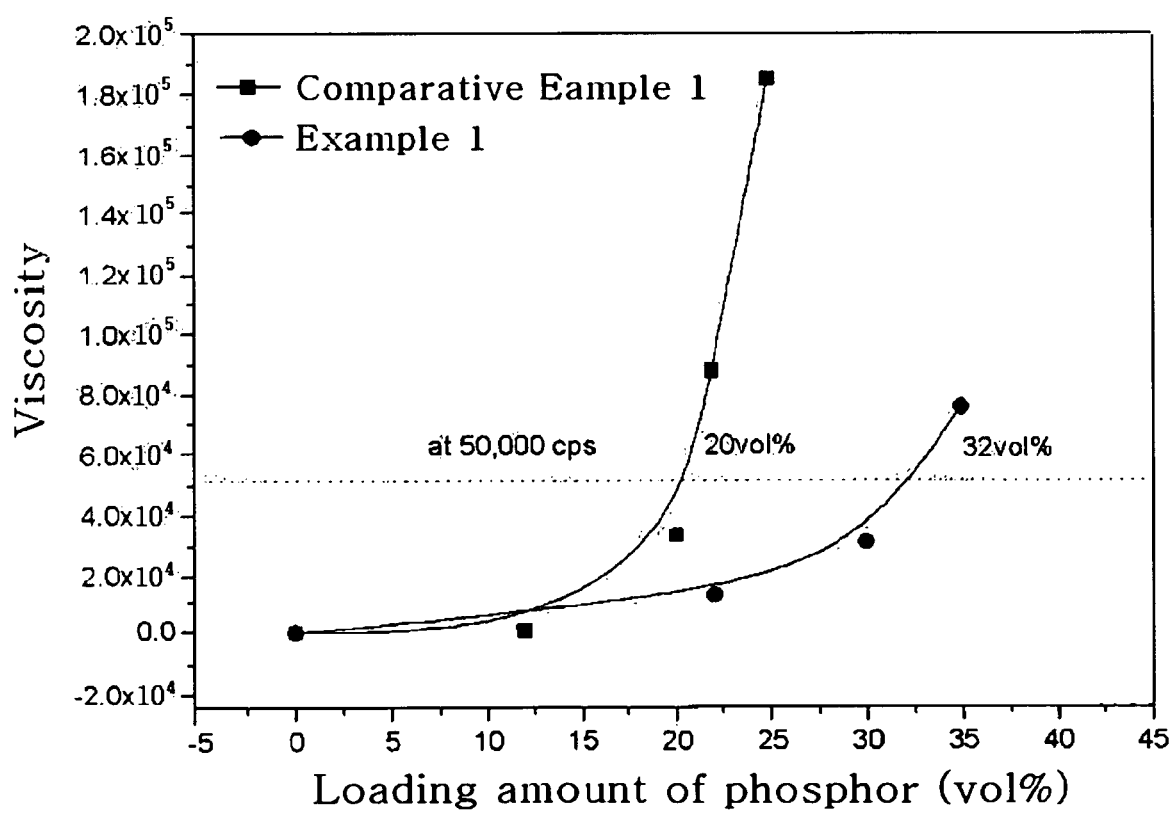
FIG. 2 is a graph showing the loading amount of phosphor powder of each of the phosphor paste compositions prepared in Example 1 and Comparative Example 1.

When the phosphor paste composition was prepared by adding a phosphor ($BaMgAl_{10}O_{17}:Eu^{2+}$ powder) to the binder solution containing the dispersant as in Example 1, the amount of the phosphor was increased so that the viscosity of the resulting phosphor paste composition was 50,000 cps, and the variation in viscosity depending on the loading amount of the phosphor was measured. The results are shown in FIG. 2. The viscosity varying with the amount of the dispersant (wt % of the phosphor powder) was measured at 24.5-25.5° C. for 30 sec using a No. 14 spindle by use of a viscometer (RV-II, Brookfield, USA). For comparison, when the phosphor paste containing no dispersant as in Comparative Example 1 was prepared, the viscosity varying with the loading amount of the phosphor was determined. The results are also depicted in FIG. 2.

As is apparent from FIG. 2, the phosphor paste composition containing phosphate ester as a dispersant of Example 1 had about 32 vol % of phosphor, which was increased to about 160%, compared to 20 vol % of the phosphor included in the phosphor paste composition containing no dispersant of Comparative Example 1. Thereby, the use of dispersant upon the preparation of the phosphor paste composition was confirmed to result in an increased loading amount of the phosphor.

Experimental Example 2

Assay of Viscosity Varying with Amount of Dispersant

In order to measure the variation in viscosity depending on the amount of phosphate ester used as a dispersant in the composition of embodiments of the present invention, while the dispersant was added in increasing amounts to each of the phosphor paste compositions in Example 1 and Comparative Examples 2 and 3, the variation in viscosity was observed. The results are depicted in FIG. 3.

Figure 3:
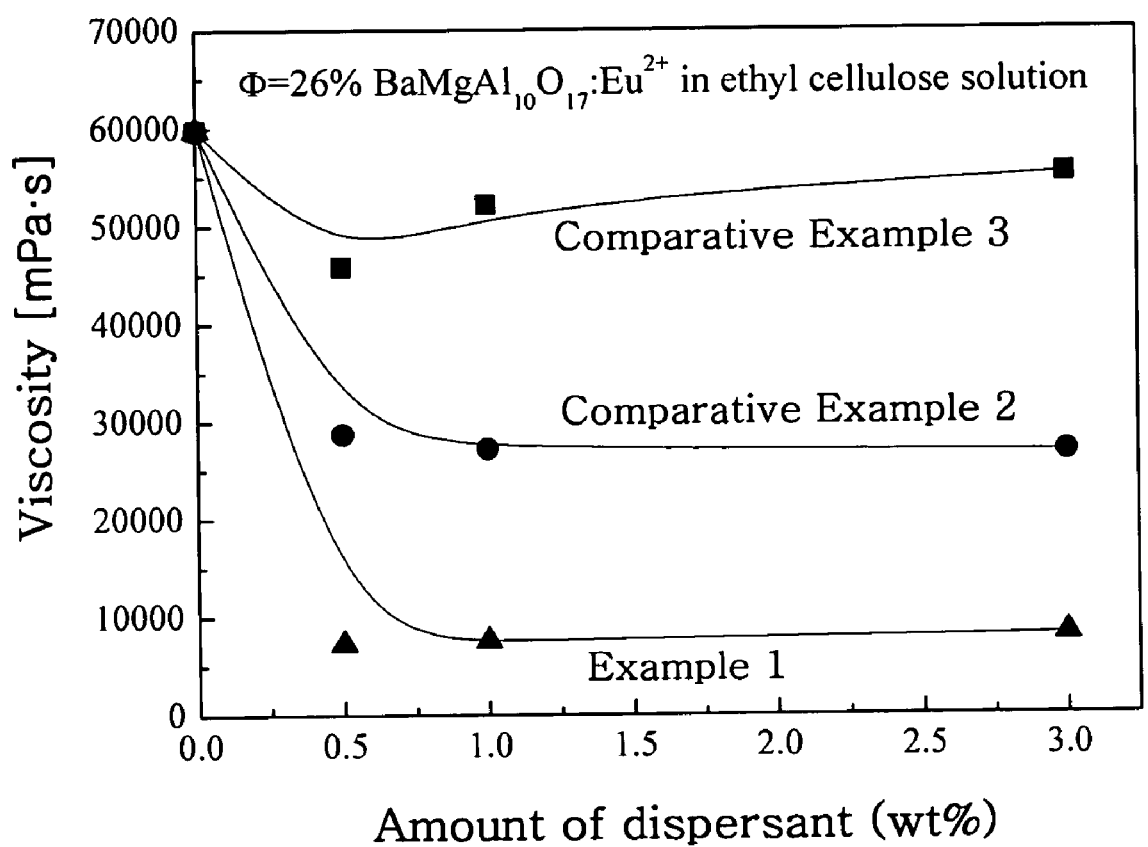
FIG. 3 is a graph showing the variation in viscosity depending on the amount of a dispersant of each of the phosphor paste compositions prepared in Example 1 and Comparative Examples 2 and 3.

As is apparent from FIG. 3, although the viscosity of the composition of Example 1 was drastically decreased at the beginning of the addition of the dispersant, it was not further decreased even with the subsequent addition of phosphate ester as a dispersant. In this way, in embodiments of the present invention, the viscosity of the composition was confirmed to greatly decrease even in the presence of a small amount of phosphate ester as a dispersant. On the other hand, in the phosphor paste composition containing the conventional dispersant used in Comparative Example 2, the decrease in viscosity due to the addition of a dispersant was insignificant, compared to the composition of Example 1. In addition, the viscosity of the composition of Comparative Example 3 was decreased at the beginning of the addition of the dispersant and then gradually increased somewhat as more dispersant was added.

Experimental Example 3

Assay of Viscoelasticity of Phosphor Paste Composition

Figure 4A:
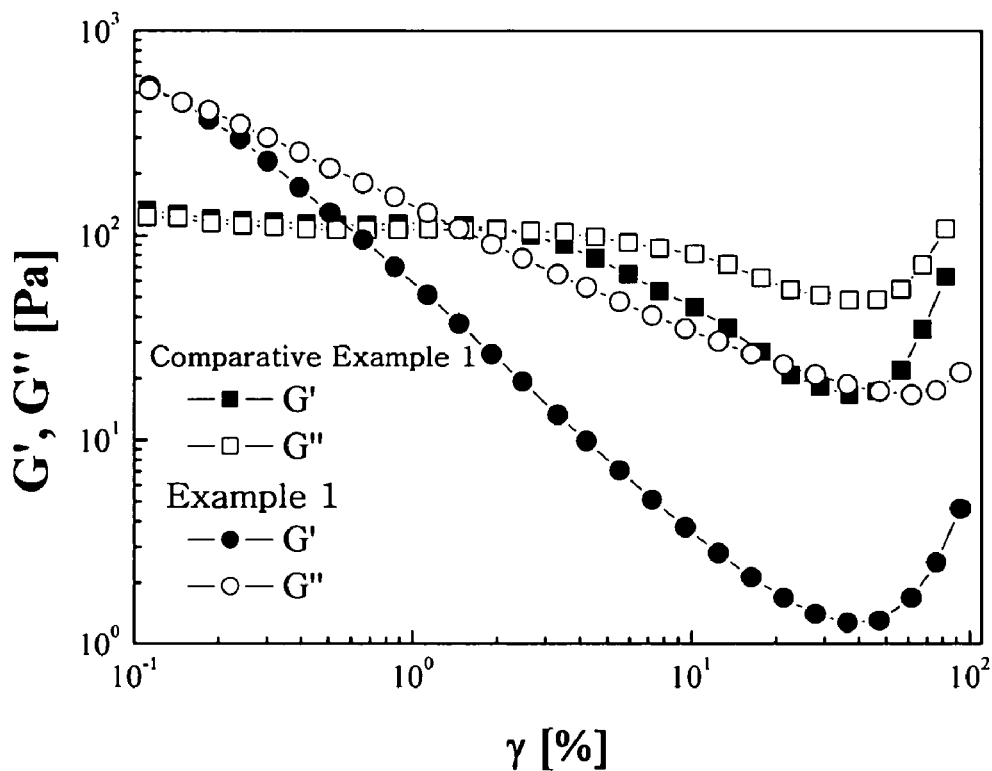
FIGS. 4A and 4B are graphs showing the viscoelasticity of each of the phosphor paste compositions prepared in Example 1 and Comparative Example 1.

In order to analyze the interaction of particles in the presence of a dispersant of embodiments of the present invention, oscillatory shear measurement was conducted using a cone and plate geometry (d=49.94 mm, angle=0.992°, truncated 50 μm). Each of the phosphor paste composition with dispersant of Example 1 and the phosphor paste composition without dispersant of Comparative Example 1 was assayed for the effect of strain amplitude on storage modulus (G') and loss modulus (G"). The results are depicted in FIG. 4A. At small strain amplitude, the paste of Comparative Example 1 was present in a linear viscoelastic region (LVE) in which G' was constant. The maximum strain amplitude, in which G' was uniformly maintained in the range of less than the maximum strain amplitude, is referred to as critical amplitude (yo), which indicates the energy required to break the suspension structure. In the phosphor paste composition of Comparative Example 1, G' was slightly larger than G" (G'>G") in the total strain range, which means that the corresponding system has an agglomerated particle network. On the other hand, in the phosphor paste composition of Example 1, G" was slightly larger than G' (G'<G") without LVE in the total strain range, which proves that the phosphor paste composition of Example 1 has the same properties as a viscous fluid. That is, although the phosphor paste composition of Comparative Example 1 had agglomerated phosphor particles, the phosphor paste composition of Example 1 was efficiently dispersed to be in a fluid phase.

Figure 4B:
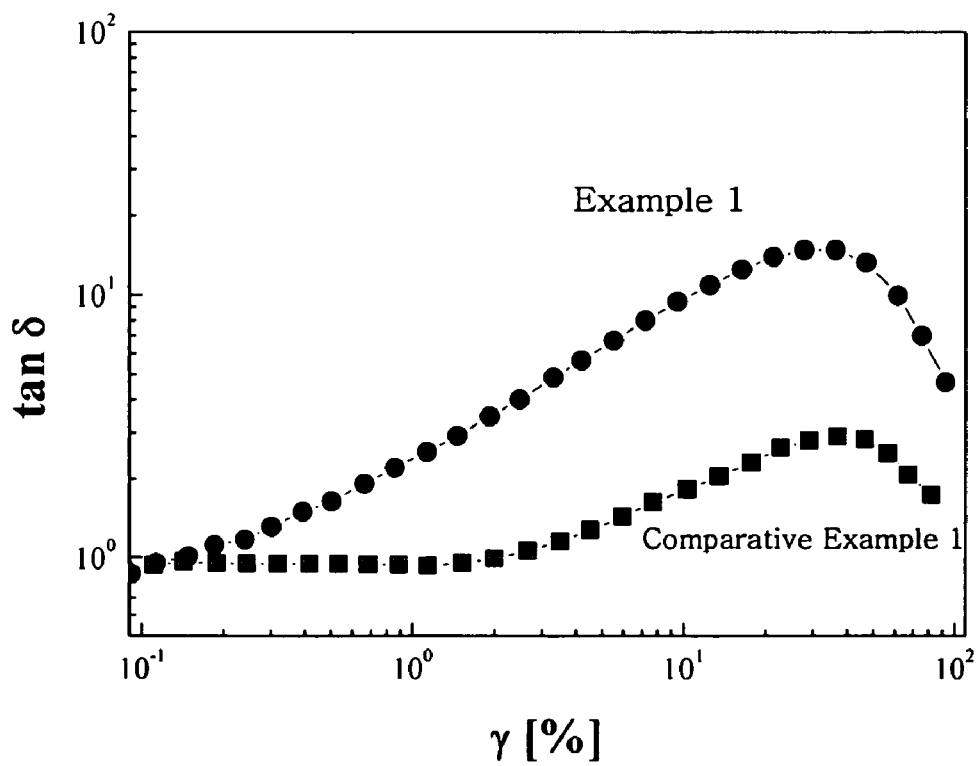

FIG. 4B shows a loss tangent (tan δ=G"/G') as a strain function of each of the phosphor paste compositions of Example 1 and Comparative Example 1. The tan S of the phosphor paste composition of Example 1 was larger than that of the phosphor paste composition of Comparative Example 1. The kinetically movable space is increased in an efficiently dispersed suspension but is decreased in an agglomerated suspension. When the dispersant of embodiments of the present invention was added, the composition was efficiently dispersed, so that more kinetically movable spaces were formed, unlike in the composition of Comparative Example 1. Thereby, external force was confirmed to be mainly applied to a particle dispersion system.

Experimental Example 4

Analysis of Scanning Electron Micrograph of Phosphor Screen

Figure 5A:
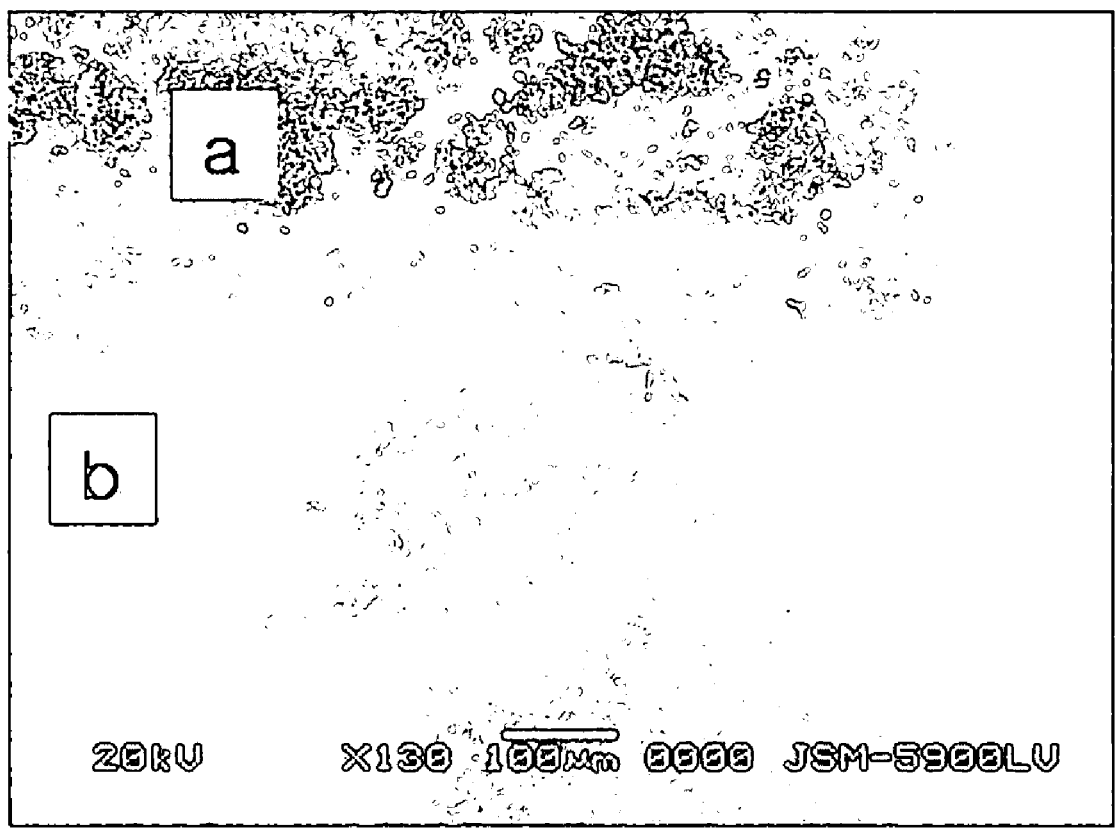
FIG. 5A is scanning electron micrographs showing a phosphor screen formed of the phosphor paste composition of Comparative Example 1.
Figure 5A:
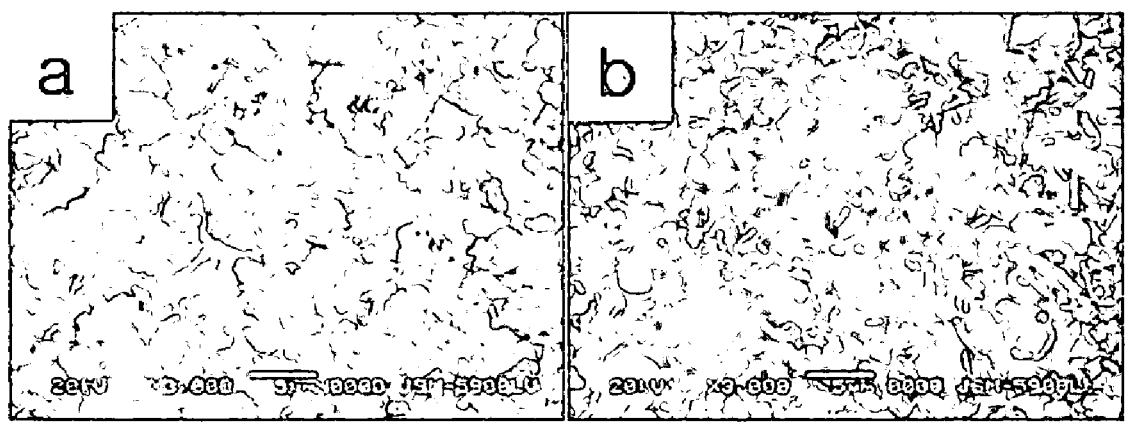

Each of the phosphor paste compositions prepared in Example 1 and Comparative Example 1 was applied to a thickness of 30 pm on a glass substrate using a film applicator (BYK-Gardner°). The coating layer was baked at 480° C. using a 5° C./min lamp to form a phosphor screen, the sintered fine structure of which was observed using a scanning electron microscope (Hitachi S-4200, Japan). FIG. 5A illustrates scanning electron micrographs of the phosphor screen manufactured using the phosphor paste composition without dispersant of Comparative Example 1, and FIG. 5B shows scanning electron micrographs of the phosphor screen manufactured using the phosphor paste composition with dispersant of Example 1.

Figure 5B:
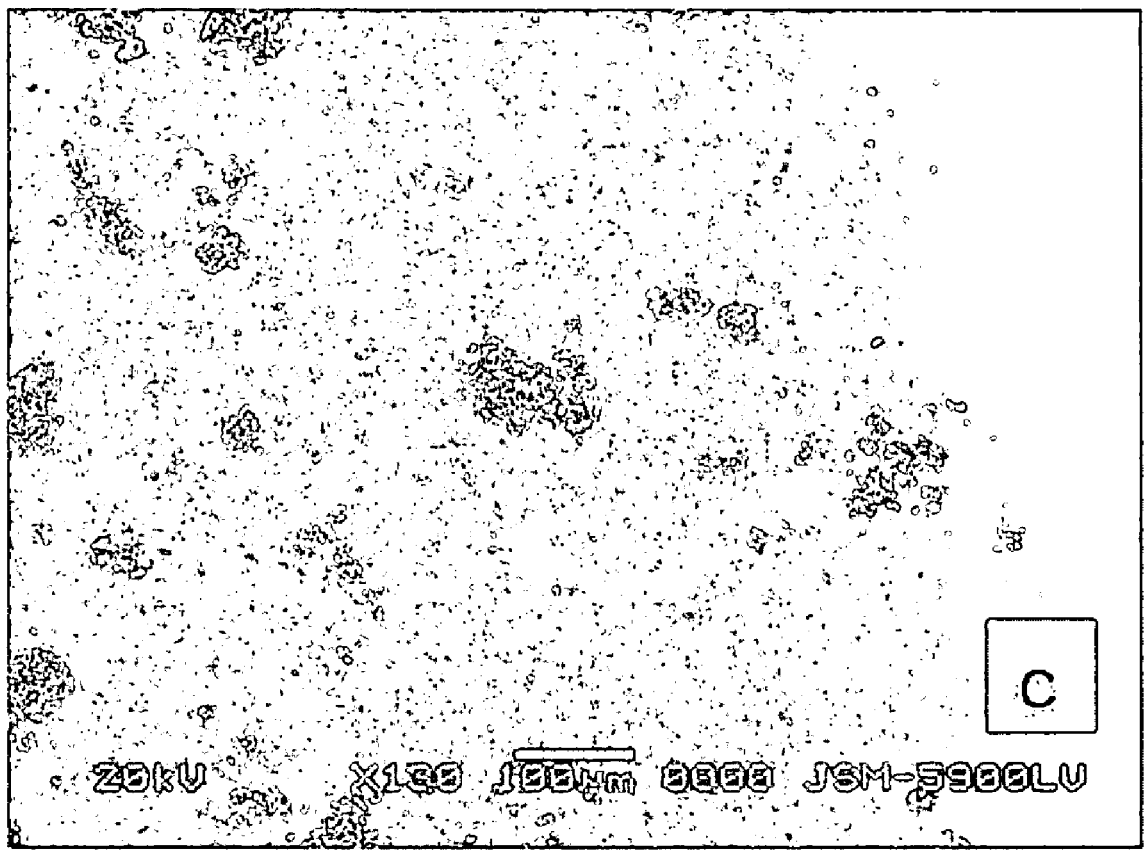
FIG. 5B is scanning electron micrographs showing a phosphor screen formed of the phosphor paste composition of Example 1.
Figure 5B:
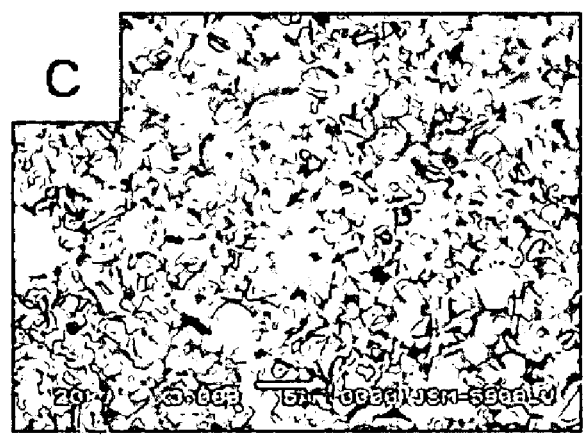

As shown in FIG. 5B, the phosphor screen resulting from the use of the paste of Example 1 observed individual grains and had a very uniform pore distribution. However, the structure of the phosphor screen manufactured using the paste of Comparative Example 1 was very porous (position "a" in FIG. 5A).

Experimental Example 5

Assay of Luminescence Properties of Phosphor Paste Composition

Figure 6:
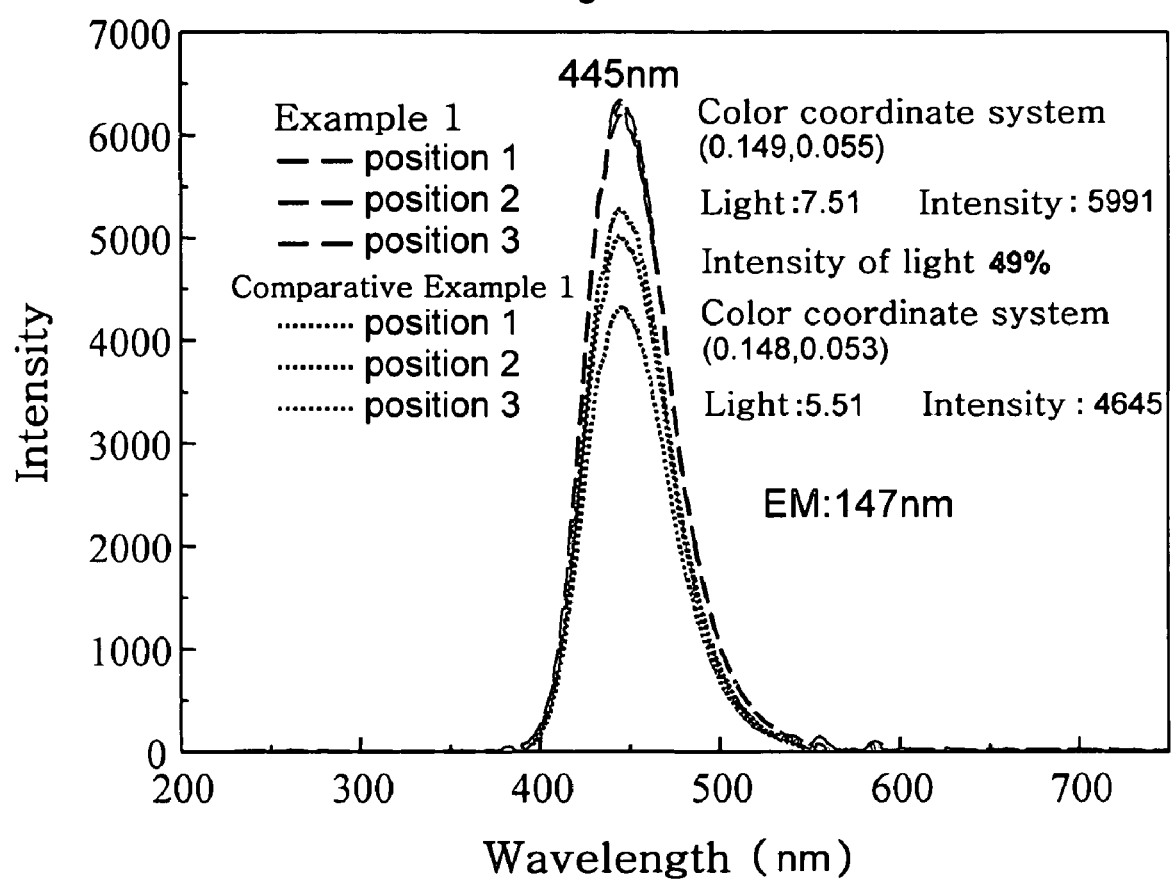
FIG. 6 is a graph showing luminescence properties of the phosphor screens formed of the phosphor paste compositions of Example 1 and Comparative Example 1.

Each of the phosphor paste compositions prepared in Example 1 and Comparative Example 1 was applied to a thickness of 30 film on a glass substrate using a film applicator (BYK-Gardner®). The coating layer was baked at 480° C. using a 5° C./min lamp to form a phosphor screen, luminescence properties of which were then tested. The test for luminescence properties was conducted using PEDS (Phosphor of Emission and Decay measurement System, which is an assembly of a VUV excimer lamp, available from USHIO, Japan, and a vacuum chamber system, available from Motech Vacuum, Korea), under conditions of a vacuum atmosphere ranging from 10 to 3 torr, a light source of a wavelength of 146 nm, a measurement wavelength ranging from 230 to 780 nm, and a 1 nm interval between wavelengths. The results are shown in FIG. 6. As such, the phosphor paste compositions obtained in Example 1 and Comparative Example 1 were each used in the manufacture of three phosphor screen samples, the luminescence properties of which were then measured and represented by the corresponding curves.

From FIG. 6, it could be confirmed that the phosphor screen sample having phosphate ester as a dispersant according to embodiments of the present invention had a main emission peak from 400 to 500 nm, which is the wavelength range emitting blue light, and had a maximum emission intensity at 445 nm and almost the same color coordinate system as Comparative Example (Example 1: 0.149, 0.055, Comparative Example 1: 0.148, 0.053). In addition, the phosphor paste composition of Example 1 (5991) was confirmed to emit light about 130% stronger than did the phosphor paste composition of Comparative Example 1 (4645). Even if the luminance was increased, other light properties were seldom changed, thus exhibiting excellent color reproducibility. Therefore, the phosphor screen of embodiments of the present invention was confirmed to serve as a phosphor screen for general display devices, such as PDPs or LCDs.

As described hereinbefore, embodiments of the present invention provides a phosphor paste composition comprising phosphate ester as a dispersant and a display device using the phosphor paste composition. According to embodiments of the present invention, the phosphor paste composition includes a dispersant which is selected from the group consisting of iso-octylphenol ethoxylated phosphoric acid, phosphate ester of a block copolymer of nonylphenol and polyoxyethyleneglycol, and phosphate ester containing an acryl backbone. Thus, in the case where such a composition is applied to form a phosphor screen, the viscosity of the composition may be uniformly maintained and the loading amount of the phosphor may be increased, thereby improving luminance and maintaining excellent workability. Therefore, phosphor screens of FPDs, etc., and display devices can be desirably obtained.

Although the preferred embodiments of embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A phosphor paste composition, comprising:
(i) a binder solution comprising a solvent and an organic binder,
(ii) 0.1 to 3 wt % of phosphate ester of the formula:

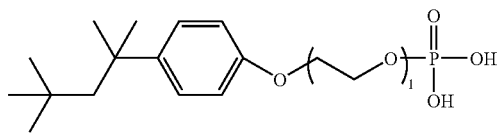

wherein l is an integer from 1 to 20, and
(iii) 40 to 70 wt % of a phosphor.

2. The phosphor paste composition as set forth in claim 1 wherein the phosphate ester (ii) is:

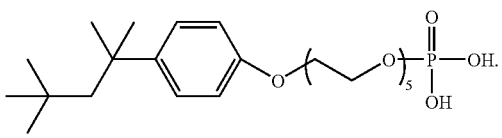

3. The phosphor paste composition as set forth in claim 1 wherein the solvent of the binder solution (i) comprises a solvent mixture.

4. The phosphor paste composition as set forth in claim 1, wherein the binder solution (i) comprises 1.5-5 wt % of the organic binder.

5. The phosphor paste composition as set forth in claim 1, wherein the organic binder of binder solution (i) comprises a cellulose based polymer including ethyl cellulose, and the solvent of binder solution (i) is a solvent mixture comprising terpineol and butyl carbitol acetate.

6. The phosphor paste composition as set forth in claim 1, wherein the phosphor (iii) is a phosphor in a form of a solid solution of a mixture comprising barium oxide, magnesium oxide and aluminum oxide.

7. The phosphor paste composition as set forth in claim 5 wherein the cellulose based polymer of binder solution (i) is ethyl cellulose.

8. The phosphor past composition as set forth in claim 7 wherein the solvent mixture of binder solution (i) comprises terpineol and butyl carbitol acetate mixed in a weight ration of 1:1.7.

9. The phosphor paste composition as set forth in claim 7, wherein the solvent mixture comprises terpineol and butyl carbitol acetate mixed at a weight ratio from 1:1 to 1:2.5.

* * * * *